ELECTRONIC CIRCUIT PROTECTION DEVICE PROVIDING A LOW RESISTANCE PATH THROUGH A SERIES OF SPARK GAPS CONNECTED ACROSS SAID ELECTRONIC CIRCUIT

Filed March 14, 1963 3 Sheets-Sheet 1

INVENTORS,
ANTHONY J. BUFFA,
SOL SCHNEIDER &
MORTIMER H. ZINN.
BY
Edward J. Kelly
ATTORNEY.

July 12, 1966 A. J. BUFFA ETAL 3,260,895

ELECTRONIC CIRCUIT PROTECTION DEVICE PROVIDING A LOW RESISTANCE PATH THROUGH A SERIES OF SPARK GAPS CONNECTED ACROSS SAID ELECTRONIC CIRCUIT

Filed March 14, 1963 3 Sheets-Sheet 2

INVENTORS,
ANTHONY J. BUFFA,
SOL SCHNEIDER &
MORTIMER H. ZINN.

BY

Edward J. Kelly

ATTORNEY.

ELECTRONIC CIRCUIT PROTECTION DEVICE PROVIDING A LOW RESISTANCE PATH THROUGH A SERIES OF SPARK GAPS CONNECTED ACROSS SAID ELECTRONIC CIRCUIT
Filed March 14, 1963 3 Sheets-Sheet 3
FIG. 7
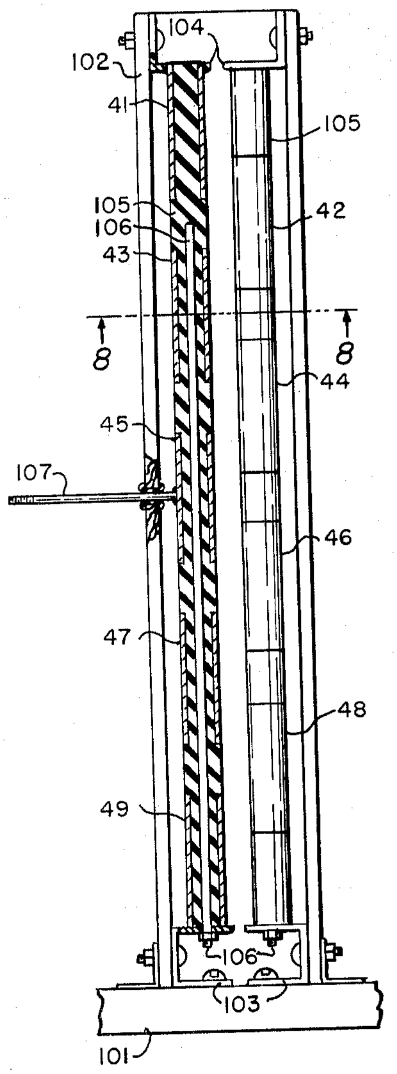
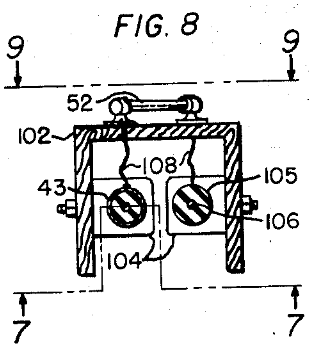
FIG. 9
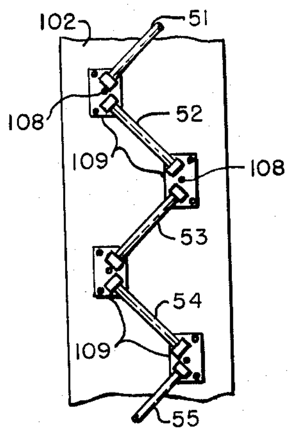
INVENTORS,
ANTHONY J. BUFFA,
SOL SCHNEIDER &
MORTIMER H. ZINN.
BY
Edward J. Kelly
ATTORNEY.

United States Patent Office 3,260,895
Patented July 12, 1966

3,260,895

ELECTRONIC CIRCUIT PROTECTION DEVICE PROVIDING A LOW RESISTANCE PATH THROUGH A SERIES OF SPARK GAPS CONNECTED ACROSS SAID ELECTRONIC CIRCUIT

Anthony J. Buffa, West Long Branch, Sol Schneider, Little Silver, and Mortimer H. Zinn, West Long Branch, N.J., assignors to the United States of America as represented by the Secretary of the Army Filed Mar. 14, 1963, Ser. No. 265,607
5 Claims. (Cl. 317—16)

The invention described herein may be manufactured and used by or for the Government for governmental purposes, without the payment of any royalty thereon.

The present invention relates to an electronic circuit protection device and more particularly to a device for diverting energy away from an electronic circuit which may be damaged by such energy.

The recent utilization of high-power transmitters has found a need for the development of devices capable of protecting R-F generators, high-vacuum modulator tubes, and high-voltage components in the event of an arc in any of these components. This need is particularly evident in equipment operating at high voltage with large values of stored energy in capacitor banks. The high voltage increases the probability of arcing and the high energy increases the probability of catastrophic destruction of the components.

Of course, most power supplies and capacitor banks are supplied with circuit breakers which will be tripped when an arc is developed in the utilization device. However, circuit breakers are not entirely satisfactory since such devices require a mechanical movement causing their trip time to be relatively long. Also, if the circuit breaker is in the power supply circuit the energy stored in the capacitor bank will still be permitted to discharge through the utilization device, thereby causing damage. On the other hand, if the breaker is incorporated in the capacitor-bank circuit, an arc may develop across the breaker or the capacitor bank may be left wtih a potentially dangerous charge.

This problem is overcome by the present invention by providing a low resistance path or a short circuit for diverting substantially all the energy in the capacitor bank away from the utilization device until the circuit breakers are opened and the capacitor bank is fully discharged. The low resistance path consists of an array of fired spark gaps connected across the utilization device. When an arc is initiated in the utilization device the resulting increase in power is detected and a trigger pulse is then applied to the spark gap circuit for firing the gaps. Of course, these gaps provide an infinite resistance or an open circuit when the utilization device is operating under normal conditions.

In order for the protection device to successfully protect the utilization device, it must have the following characteristics: (a) rapid firing after application of the trigger pulse, (b) low voltage drop after firing, (c) low energy triggering capability, (d) large range of operating voltage i.e. the device should be capable of being triggered when there is zero voltage across the utilization device. The need for (a) and (b) alone is evident; the device must achieve a condition approaching that of a short circuit across the arcing component as rapidly as is possible so as to divert the energy from the arc before any damage has occurred. The diverter obviously must be capable of passing the short-circuit current value without being damaged itself. The low triggering requirement is dictated by the usual desire for circuit simplicity and small size, but is also necessary to minimize any pulse signal that may appear in the main circuit during triggering of the spark gaps. Requirement (d) stems from the possible need for circuit operation over a wide voltage range for which protection is desired. This is particularly needed in high-power electron tube processing equipment where arcing is possible at the lower values of plate-supply voltage, until seasoning of the electron tube permits stable operation at the higher voltages. There is, however, a need for low-plate-voltage triggering capability to provide for a repetitive firing of the spark gaps and the opening of the circuit breakers, in order to prevent reinitiation of the arc in an electron tube that may have evolved gas during the initial stages of the original arc.

In addition to the characteristics discussed above, the diverter must reliably hold off the desired high voltage without self-triggering induced either by atmospheric effects or the normal pulses appearing in the main circuit. A low value of acoustic energy generated by the firing of the spark gaps is also desirable.

It is therefore the object of this invention to provide a protection device for diverting energy away from a utilization device, which may be damaged by such energy, and wherein the diverter circuit meets all of the desired requirements discussed above. Other objects and features of the invention will become apparent to those skilled in the art as the disclosure is made in the following description of a preferred embodiment of the invention as illustrated in the accompanying drawings in which:

FIGURE 7 is a view of still another modification of the invention taken on the lines 7—7 of FIGURE 8 and looking in the direction of the arrows;

FIGURE 8 is a view taken on the lines 8—8 of FIGURE 7 and looking in the direction of the arrows;

FIGURE 9 is a view taken on the lines 9—9 of FIGURE 8 and looking in the direction of the arrows.

Figure 1:
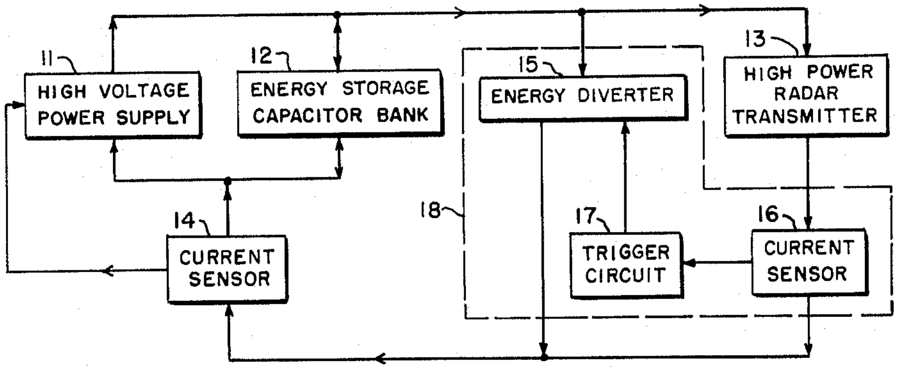
FIGURE 1 shows a block diagram of the invention as it would be used to protect a utilization device.

Referring now to the drawings, wherein like reference characters designate like or corresponding parts throughout the several views, there is shown in FIGURE 1, a high-voltage power supply 11 for supplying energy to an energy storage capacitor bank 12 which in turn is periodically discharged through an oscillator tube such as a high power klystron, magnetron etc. for generating R-F energy in the conventional high power radar transmitter 13. A current sensor 14 is also provided in the return path between the radar 13 and the capacitor bank 12 to measure the rate at which the energy from capacitor bank 12 is being supplied to radar 13. If an arc should develop in any of the R-F generators, high-vacuum modulator tubes or high-voltage components of radar 13, the rate of energy supplied will increase to a dangerous level thereby increasing the current in the return path through current sensor 14. Current sensor 14 will then detect this rise in current and supply a signal to a circuit breaker in the power supply 11. However, the conventional mechanical circuit breakers have a relatively long trip time and are ineffective, as stated above, for protection of the arcing component. Protection of these components is provided, however, by providing an energy diverter 15, in the system, between the capacitor bank 12 and the radar 13 for diverting the energy away from the radar while the circuit breaker in power supply 11 is being tripped. A second current sensor 16 will detect the overload or increase in current through radar 13 and energize a trigger circuit 17 which in turn will energize the diverter 15.

Figure 2:
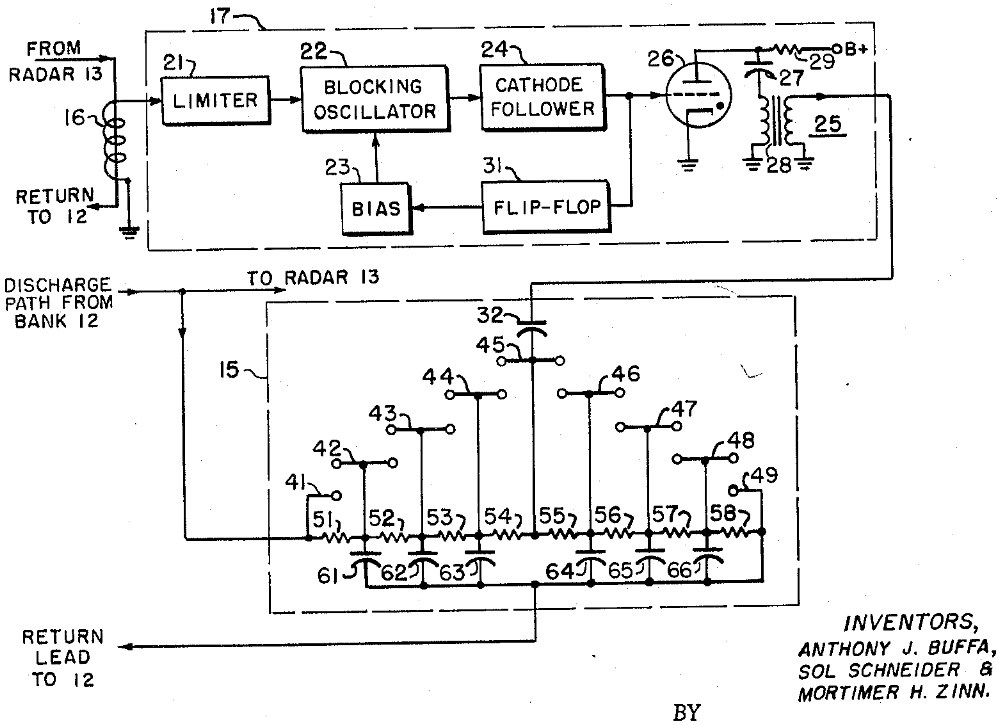
FIGURE 2 shows a schematic diagram of the details of the diverter and its associated circuits.

The components enclosed by dotted line 18 in FIGURE 1 i.e. diverter 15, trigger circuit 17 and current sensor 16 are shown in detail in FIGURE 2.

Current sensor 16, which may be a current transformer and is shown schematically as a coil wound around the return lead of the radar transmitter 13, is connected to a limiter 21 in the trigger circuit 17. Limiter 21, which may simply be a back biased diode, will determine the allowable level of current desirable in the return lead of radar 13. If the current in the return lead should rise above the allowed level, the output from coil 16 will be passed by limiter 21 on to the blocking oscillator 22 as a synchronous signal to initiate oscillations. Blocking oscillator 22 is normally biased to cut off by bias circuit 23. The oscillations from blocking oscillator 22 is fed to pulse generator 25 through a cathode follower 24. Cathode follower 24 is provided for matching purposes and will isolate the pulse generator 25. Pulse generator 25 comprises a thyratron 26 whose control electrode is connected to the output of the cathode follower 24. A capacitor 27 and a step-up transformer 28 are connected across the plate-cathode circuit which is also connected to a high B+ voltage through a limiting resistor 29. Capacitor 27 will be charged by the B+ voltage when thyratron 26 is cut off. When a pulse appears on the control electrode thyratron 26 is turned on and capacitor 27 is permitted to discharge through the step-up transformer 28 and the thyratron 26 to provide a high voltage pulse to the diverter 15. It can therefore be seen that when the output from coil 16 exceeds the back-bias voltage of limiter 21, blocking oscillator 22 will become a free-running oscillator whose frequency of oscillation is controlled by an R-C circuit to any desired interpulsed interval, thereby providing a series of pulses to thyratron 26. Pulse generator 25 which is controlled by the oscillator 22 will then provide a series of trigger pulses to diverter 15 through the transformer 28. As was explained earlier, it is desirable that the diverter 15 be energized or fired when there is little or no current in the return lead from radar 13, after an arc has been initiated. This is necessary since electronic components and tubes in radar 13 may be damaged even at low voltages immediately after such elements have experienced an arc. Therefore, to insure that the diverter is operating at all times until the circuit breakers are open and the capacitor bank 12 is fully discharged, the bias 23 on oscillator 22 is removed for this period. This is accomplished by sampling the first pulse from cathode follower 24 and feeding this sample to a flip-flop circuit 31. The output pulse from flip-flop 31 is fed to bias circuit 23 to remove the bias on oscillator 22 to permit oscillations even when there is no further signal from sensor 16. The period of the output pulse from flip-flop 31 is adjusted such that it is longer than the trip time of the circuit breakers in the power supply. Therefore, oscillator 22 will be periodically energizing pulse generator 25 for the entire time between the detection of the arc and the desired time after the opening of the circuit breakers.

Diverter 15 is coupled to the trigger circuit 17 by a coupling capacitor 32 which is connected to the center electrode 45 of an array of successive electrodes 41–49 in diverter 15. A voltage divider, consisting of a series of resistors 51–58, is connected from the high voltage side of radar 13 to the return or ground lead and to each of the electrodes 41–49 to distribute the high voltage evenly across the spark gaps formed by electrodes 41–49. Electrodes 42, 43, 44, 46, 47 and 48 are each coupled to the return lead or ground by a series of capacitors 61–66 respectively. Electrode 41 is connected directly to the high voltage side while electrode 49 is coupled directly to the return lead.

The firing of the diverter 15 is initiated by a high-voltage pulse from the trigger circuit 17. Capacitor 32, which is merely a coupling capacitor has a relatively large capacitance compared to the capacitance of the spark gaps and the capacitors 61–66, and will therefore contain only a negligible amount of the pulse voltage during operation. The capacitance of each spark gap is much small than the capacitance of each capacitor 61–63. Therefore, the majority of the pulse voltage from trigger circuit 17 will be across the spark gap formed by electrodes 45–44, while only a small amount will exist across capacitor 63. Of course, this same voltage will also appear across the spark gap formed by electrodes 45–46 and the capacitor 64, since this circuit is in parallel with the former circuit. The air in the spark gaps, which have been ionized by some stray radiation from the atmosphere, will break down, due to this high voltage, causing a spark across the gaps. After the spark is initiated the voltages across the gaps will drop to a relatively negligible amount and all the voltage from the trigger circuit 17 will be substantially across each capacitor 63 and 64. The voltage across capacitor 63 will now appear across the gap formed by electrodes 44–43, and capacitor 62 which are connected in parallel across capacitor 63. Most of the voltage, as before, will appear across the gap, which will then break down, as before, when some radiation enters the gap and ionizes the air. As will be seen later, the gaps may be mounted such that the spark in the gap which has broken down first will supply sufficient radiation to pre-ionize the air in the next gap thereby assuring an extremely rapid breakdown of the gaps. This analysis can be continued further and it will be seen that the spark gaps will break down two at a time starting from the center gaps, where the trigger is applied, and moving out in both directions to the end electrodes 41 and 49. After all gaps are broken down, there will then be a low resistance path through the gaps from the high voltage side to the ground or return lead. The high voltage across the gaps will usually be sufficient to keep the gaps firing, even if the trigger pulse were removed. However, as was pointed out earlier, some of the elements in a radar, after experiencing an arc, may still be damaged by a low voltage which may not keep the gaps firing. Therefore, the series of trigger pulses, supplied by trigger circuit 17, is necessary to insure that the diverter 15 is providing a short circuit path, to prevent any build up of energy from power supply 11, for the entire time necessary for the circuit breakers to trip. To prevent damage to any of the electrodes, the high voltage is distributed across the gaps evenly by the voltage divider consisting of resistors 51–58. Of course the trigger pulse could be supplied to a plurality of electrodes at the same time. This would be especially desirable if the number of gaps were increased substantially and if the firing time should need to be reduced.

Several configurations of the diverter are shown in FIGURES 3–9. The devices were actually built, and held off 300 kilovolts without firing on their own. The number of gaps were 30 (rather than as shown) and the trigger pulse was applied to the center electrode. The exact time required for firing the gaps could not be measured but was determined to be less than .1 microsecond. This firing time is more than sufficient to protect the usual high-voltage components in the conventional high-power radar transmitter. Of course, if the trigger signal should be absent for some reason and the voltage across the ultization device should rise over 300 kilovolts the device will fire starting at electrode 41.

Figure 3:
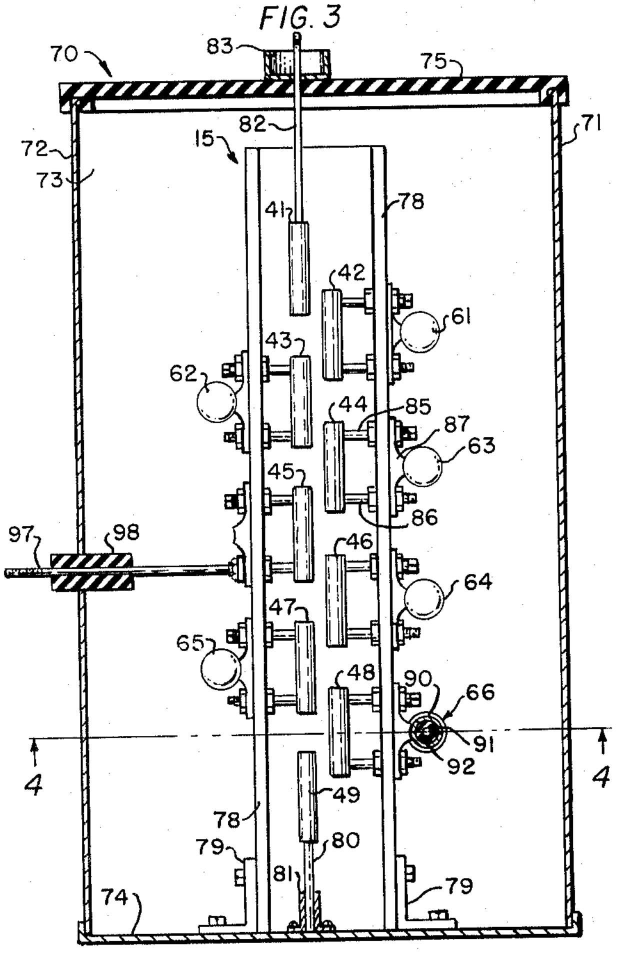
FIGURE 3 shows a front view of one modification of the diverter taken on the lines 3—3 of FIGURE 4 and looking in the direction of the arrows.
Figure 5:
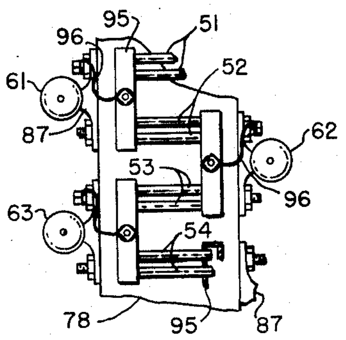
FIGURE 5 is a partial view of the rear of the device taken on the lines 5—5 of FIGURE 4 and looking in the direction of the arrows.
Figure 6:
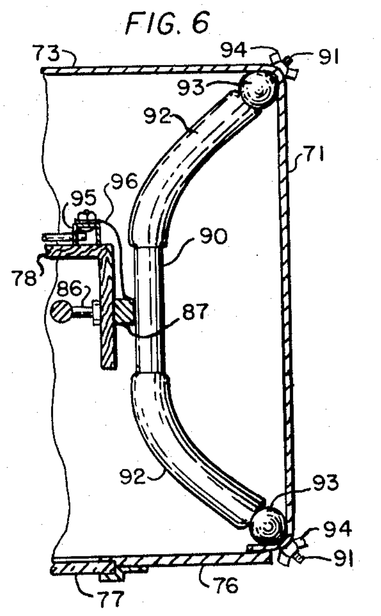
FIGURE 6 is a partial top view of another modification of the invention similar to FIGURE 4.
Figure 4:
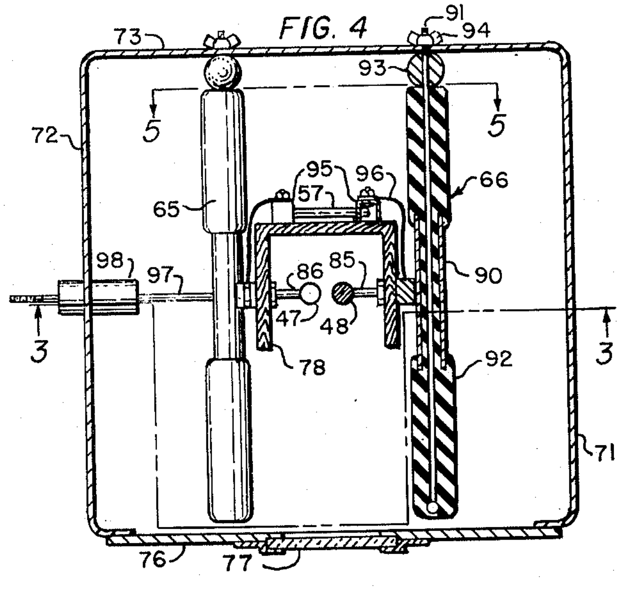
FIGURE 4 is a view taken on the lines 4—4 of FIGURE 3 and looking in the direction of the arrows.

The device of FIGURES 3–5 consists of a diverter 15 enclosed by a casing 70, having sides 71 and 72, back 73, bottom 74, top 75, and front 76. The sides, back and bottom are all metal while the top 75 is made of insulating material. The front 76, which may be removable is metal and comprises a cut out section for a glass window 77 for viewing the spark gaps. The metal casing is used as the ground and is usually connected to the return lead of the utilization device. A wood trough-like mount 78 is connected at one end by braces 79 to the bottom 74 of the casing 70. Also connected to the bottom 74, is the grounded electrode 49. This electrode, like all others, is constructed of a solid metallic cylinder. Electrode 49 has an arm 80, extending from one end, which is mounted to the bottom 74 by braces 81. Mounted to the top 75 is the electrode 41 which has a threaded arm 82 for connection to the high-voltage side of the utilization device. Arm 82 extends out of mount 78 through the top 75 and into a corona ring 83. The electrodes 41 and 49 are mounted axially at each end of mount 78 with electrodes 43, 45 and 47 mounted axially therebetween. Electrodes 42, 44, 46 and 48 are mounted axially with respect to each other and in staggered relation with respect to the remaining electrodes. The staggered electrodes are spaced a distance equal to the gap spacing. Electrodes 42–48 are all provided with threaded arms 85 and 86 which extend through the mount 78. Bolted to the arms 85 and 86 is a support 87 for supporting the capacitors 61–66. The capacitors, which are all similar, comprise a cylindrical outer conductor or plate 90 spaced from an inner conductor 91 by an insulator 92. One end of the inner conductor 91 is embedded in the insulator 92 while the other end extends from the insulator and is threaded. The outer conductor 90 is welded to the support 87, while the inner conductor is passed through a corona ball 93 and the back 73 of the casing where it is bolted by a thumb screw 94.

The resistors 51–58 of the voltage divider are mounted on the rear of the support 78. As shown in FIGURE 5 each resistor is made up of two resistor elements connected in parallel for reliability of operation. The resistors are mounted by conductive covers 95 which are bolted to the rear of the mount 78 and are connected to its associated capacitor by a conductor 96. The center electrode 45 does not have an associated capacitor, but is provided with a conductor 97 which extends through the casing 70 and is insulated therefrom by an insulator 98. Conductor 97 is provided for connection to the trigger circuit 17.

Since the voltage on the outer conductor 90 becomes extremely high at times with respect to the casing 70, which is usually grounded, it is desirable to terminate the inner conductor a greater distance from the outer conductor as much as possible. To accomplish this the arrangement shown in FIGURE 6 would be desirable. Here the capacitor is gradually bent to an angle so that it may be connected to the casing at the corners where the inner conductor is bolted to the casing by thumb screws 94.

FIGURES 7–9 shows still another modification of the diverter 15, wherein the outer conductor or plate of the capacitors is also used as the electrodes which form the spark gaps.

A ground support 101 which may be part of a metal casing supports a wooden trough-like mount 102 which supports the array of electrodes 41–49. Electrode 49 is grounded by a U-shaped clamp 103 which also supports the mount 102. Electrode 41 is connected to an L-shaped clamp 104 to which the high-voltage side of the utilization device is connected to electrode 41. Electrodes 42–49 are spaced by insulation 105 from a center conductor 106 which is also grounded by clamps 103. Conductor 107 which may be connected to the trigger circuit 17 is passed through the mount 102 and connected to electrode 45. Resistors 51–58 are mounted on the rear of mount 102 by plates 109 and connected to electrodes 41–49 by conductors 108 passed through the mount 102. This modification although providing a simpler diverter structure will be much taller than the device shown in FIGURE 5 since the length of the electrodes will be dictated by the capacitance requirements.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A device for selectively providing for a predetermined time a low resistance path across a high-power utilization device upon the detection of an abnormal rise in current in said utilization device comprising a series of electrodes mounted to form a plurality of spark gaps connected in series with each other and extending across said utilization device, a plurality of resistors connected in series with each other and connected across said utilization device, each of said resistors being connected across a different one of said spark gaps, the first electrode in said series being connected directly to one side of said utilization device and the last electrode of said series being connected directly to the other side of said utilization device, a plurality of capacitors each connected between said other side of said utilization device and to a different one of said electrodes except for said first, said last, and an intermediate electrode, and trigger means connected to said intermediate electrode for providing pulses for said perdetermined time and of sufficient value to cause successive breakdown of said spark gaps from said intermediate gap to said first and last gaps upon the detection of an abnormal rise in current in said utilization device by a current detector connected thereto.

2. In a circuit having a high-voltage power supply, an energy storage capacitor bank, and a high-power utilization device, means for selectively providing a low resistance path around said utilization device for a predetermined time longer than the time required to completely discharge said capacitor bank and to disconnect said power supply comprising; current sensing means for sensing currents passing through said utilization device above a predetermined level, energy diverter means comprising a plurality of electrodes connected to form a series of spark gaps extending across said utilization device, and trigger means connected between said sensing means and said diverter means for applying trigger pulses for said predetermined time to said diverter of a sufficient amplitude to cause breakdown of said spark gaps upon the detection by said current sensing means of a current in said utilization device above a predetermined level.

3. The device as described in claim 2 wherein the first electrode of said series of electrodes is connected to one side of said utilization device and the last electrode of said series of electrodes is connected to the other side of said utilization device while an intermediate electrode is connected to said trigger means.

4. The device of claim 3 and wherein a series of resistors are connected to said electrodes, each across said spark gap, whereby said high voltage is distributed across said spark gaps in some predetermined fashion.

5. The device of claim 4 and wherein a plurality of capacitors are connected each between a different one of said electrodes, except said last, first and intermediate electrodes, and said other side of said utilization device.

References Cited by the Examiner

UNITED STATES PATENTS

| | | | |
|---|---|---|---|
| 2,628,323 | 2/1953 | Petersen | 313—243 |
| 2,723,371 | 11/1955 | Featherstone | 317—16 X |
| 2,815,446 | 12/1957 | Coombs | 317—16 X |
| 2,862,152 | 11/1958 | Ryder | 317—12 |
| 2,878,428 | 3/1959 | Bockman | 317—12 |
| 2,928,956 | 3/1960 | Jones | 317—16 X |
| 2,973,448 | 2/1961 | Yost | 313—243 |
| 3,133,229 | 5/1964 | Fleming | 315—238 |
| 3,147,407 | 9/1964 | Warner et al. | 317—146 |

MILTON O. HIRSHFIELD, *Primary Examiner.*

SAMUEL BERNSTEIN, *Examiner.*

R. LUPO, *Assistant Examiner.*